Sept. 7, 1954     W. BAKKER     2,688,506
SEALING RING
Filed Aug. 31, 1949     2 Sheets-Sheet 1
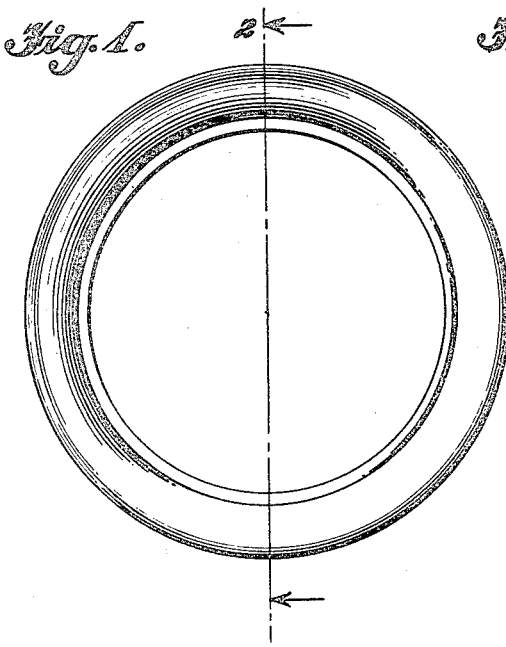
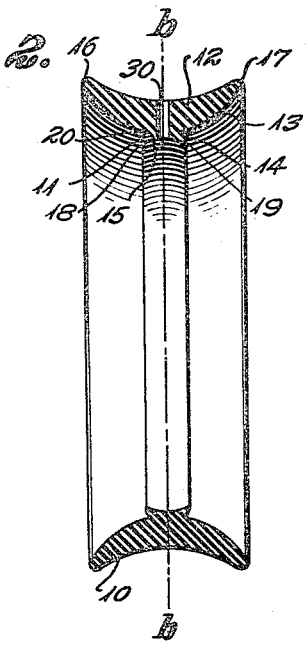
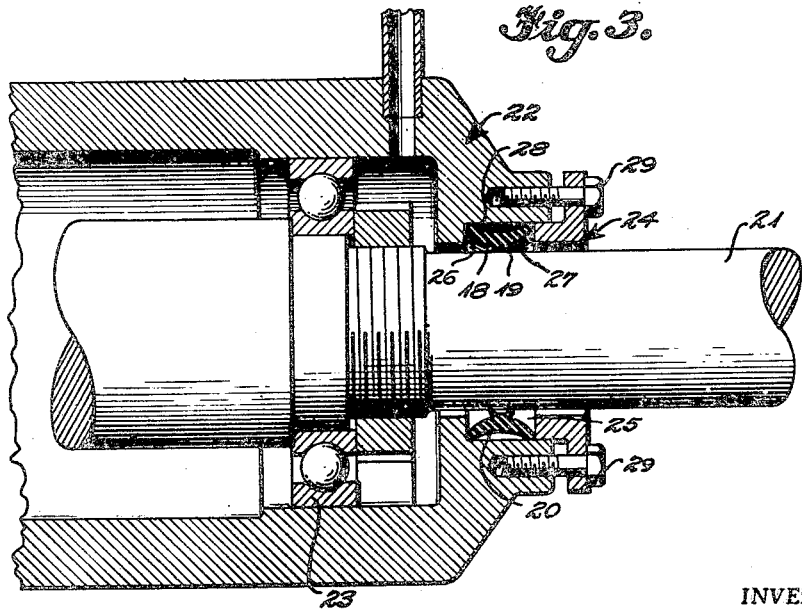
INVENTOR.
Willem Bakker
BY
Albin F. Knight
ATTORNEY INVENTOR.
Willem Bakker
BY
Albin F. Knight
ATTORNEY Patented Sept. 7, 1954

2,688,506

UNITED STATES PATENT OFFICE 2,688,506

SEALING RING

Willem Bakker, Arnhem, Netherlands, assignor to American Enka Corporation, Enka, N. C., a corporation of Delaware Application August 31, 1949, Serial No. 113,419

Claims priority, application Netherlands October 9, 1948

3 Claims. (Cl. 288—19)

This invention relates to shaft seals and more particularly to a seal for preventing fluid leakage along a rotating shaft from a high pressure zone containing one fluid to a low pressure zone containing another fluid.

In the art relating to seals for rotating shafts it has long been a common expedient to employ a flexible annular packing ring having the cross section of an X which ring is compressed axially to provide a pair of axially spaced annular sealing zones. Typical of such an arrangement is the disclosure of the patent to Hoffstadt No. 511,734.

While arrangements of the foregoing type afford certain advantages over the compression of a solid ring, there still remains the disadvantage that the contact pressure between the ring and the housing in which it is located may be so great as to cause occasional turning of the ring with the shaft with resulting failure of the seal. Furthermore, seals of the Hoffstadt type have been found to be insufficiently flexible to permit rapid adjustment to follow an eccentric shaft or a shaft undergoing severe radial vibration.

It is therefore an object of this invention to provide a packing or shaft seal which is characterized by low frictional drag on the shaft and yet which affords perfect sealing even under conditions of severe vibration or eccentricity.

According to this invention a packing or sealing ring is provided which, when subjected to axial compression, seals with much higher friction against the shaft housing than against the shaft and yet maintains a completely adequate seal against the shaft.

Other objects and advantages of this invention will be apparent upon consideration of the following detailed description of several embodiments thereof in conjunction with the annexed drawings wherein:

Figure 1 is a view in end elevation of a sealing ring constructed in accordance with the principles of the present invention;

Figure 2 is a view in section taken on the line 2—2 of Figure 1 to illustrate the longitudinal profile of the ring;

Figure 3 is a view in vertical section showing a typical installation of the ring of Figures 1 and 2;

Figure 4:
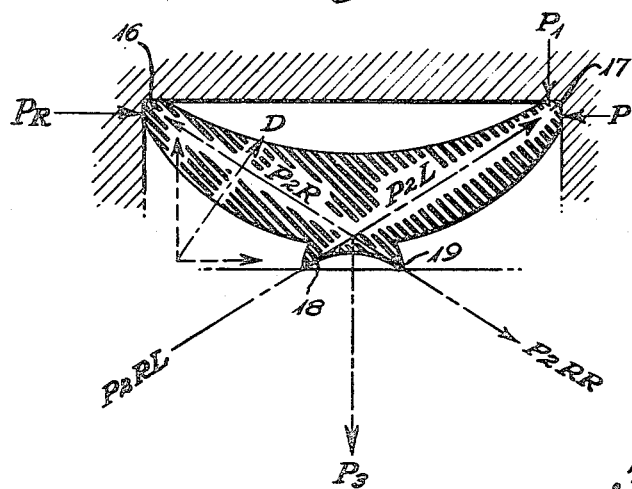
Figure 4 is a force diagram illustrating typical forces applied to a ring of the type shown in Figures 1 and 2 and the response of the ring to those forces.

If now reference is made to Figures 1 to 4, inclusive, it can be seen that the sealing ring there shown comprises a radially outer portion 10 and an integral radially inner portion 11. These portions are both crescent shaped in section which means that the radius of curvature of the concave surface 12 of the portion 10 is longer than the radius of curvature of the convex surface 13 thereof and that the two arcs are drawn from spaced centers both of which lie in a plane which passes centrally through the ring normal to its axis, see the plane b—b of Figure 2.

The inner portion 11 is of similar shape except, of course, that the arcs are taken on much shorter radii so that the maximum axial length of the inner portion is much less than the corresponding dimension of the outer portion. In the portion 11 of the ring the convex surface bears reference numeral 14 and the concave surface reference numeral 15.

The outer portion 10 of the ring terminates in very narrow annular ridges 16 and 17 and the inner portion terminates in like narrow annular ridges 18 and 19. The inner and outer portions are arranged convex side to convex side with the surfaces 13 and 14 tangent at the plane b—b of Figure 2 to form an integral connecting neck 20.

The position of the ring, in use, can be seen by reference to Figure 3 wherein the numeral 21 represents a shaft projecting from a housing 22 which contains shaft bearings 23 and which defines with a follower 24 an annular space 25 for the accommodation of packing. The annular space 25 is defined by an end wall 26 constituting a part of the housing 22, an end wall 27 constituting surface of the follower 24, a cylindrical outer wall 28 constituting a part of the housing 22 and an inner cylindrical wall which is the surface of the shaft 21.

The sealing annulus which is made of resilient material such as natural or synthetic rubber is placed in the annular space 25 defined by the surface of the shaft 21 and the surfaces 26, 27 and 28 and is subjected to axial compression by movement of the follower 24 to the left as it is viewed in Figure 3. This movement is accomplished by the use of a plurality of circumferentially spaced bolts 29 two of which show in Figure 3. As the ring is compressed axially by movement of the follower 24, various forces are developed and these forces are diagrammed in Figure 4. The force P is that force exerted directly by the surface 27. The opposing force exerted by the surface 26 is represented as PR in Figure 4, whereas the force exerted by the surface 28 is represented as P₁. The forces exerted by the annular ridges 18 and 19 in bearing engagement with the surface of the shaft 21 are represented as P₂L and P₂R.

If now it is assumed that a fluid under pressure is contained within the housing 22, it is apparent that that pressure will be exerted on the whole of the convex surfaces 13 and 14 which lie to the left of the plane b—b of Figure 2. The resulting compressive force acts at right angles to the left one-half of the ring along the line D. The line D is generally opposite in direction to the line P₂RL which represents the force maintaining the seal at ridge 18, that force being one component of the radially inwardly acting force P₃, the other component of which acts on the ridge 19 and is indicated at P₂RR. It is perfectly apparent that since force D acts generally oppositely to force P₂RL, that sealing at the ridge 18 is maintained only when P₃ is greater than the vertical component of D. This can be readily enough understood when it is borne in mind that the vertical component of D tends to unseat the ridge 18 whereas the horizontal component thereof tends to seat the ridge 18. The force D as a whole, however, acts at right angles to the force P₂R and consequently exerts a toggle effect between the ridge 16 and the ridge 19. Thus, when D increases beyond P₂RL, ridge 18 is unseated but ridge 19 is seated with increasing force proportional to D so that the seal is adequately maintained despite the existence of a large pressure differential across the sealing ring as a whole.

As compared to prior art practice, the axial length of the sealing ring of the present invention is small. The pressure which is to be exerted is, of course, adjustable due to the action of the follower 24.

If a cooling liquid or lubricant is used communication can be established between the space defined by the concave surface 12 and the surface 28 and the space defined by the concave surface 15 and the shaft by providing one or more ports through the neck 20, see in this regard the opening 30 shown in Figure 2.

Figure 5:
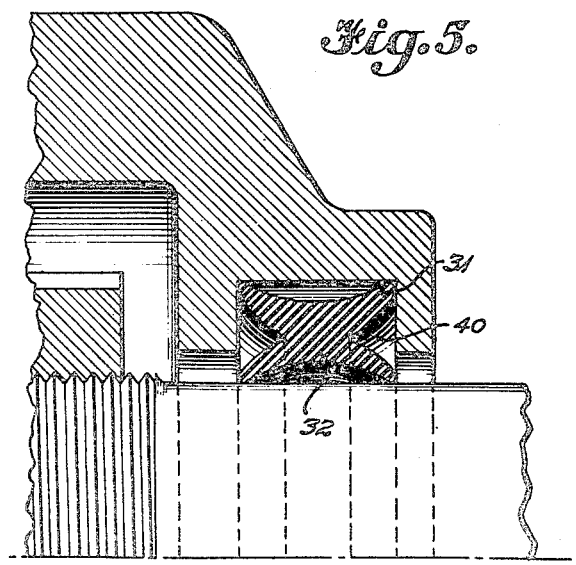
Figure 5 is a fragmentary radial section of a modified type of ring construction in accordance with the principles of the present invention.

In Figure 5 there is shown a modification of the invention in which the axial length of the upper and lower portions of the ring are, in repose, more nearly equal. In this case the outer portion bears reference numeral 31 and the inner portion bears reference numeral 32. The portions 31 and 32 are crescent shaped as viewed in radial section and their function in operation is very similar to that described above in connection with the portions 10 and 11. It will be noted that the convex surface of portion 31 exceeds in area the convex surface of the portion 32, so that the toggle action described above in connection with Figure 4 can be achieved in this instance. Furthermore, in repose, the axial length of the portion 31 slightly exceeds the axial length of the portion 32. The outer portion 31 is thicker than the inner portion 32 and in assembly the ridges at the ends of the inner portion 32 coact with the shaft while the ridges at the ends of the outer portion 31 seat against the housing cavity which is provided for the sealing ring.

Figure 6:
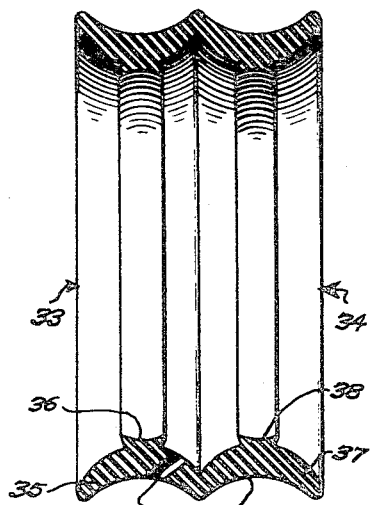
Figure 6 is a similar view of another modification of a sealing ring in accordance with the principles of the present invention.

In Figure 6 a still further modification of the invention is shown and that modification is in effect two axially contiguous sealing rings each individually corresponding generally in structure to the ring shown in Figure 2. In Figure 6 the rings bear reference characters 33 and 34. The ring 33 comprises an outer crescent shaped portion 35 and an inner portion 36 of like shape and the ring 34 comprises an outer portion 37 and an inner portion 38 corresponding respectively in shape to the portions 35 and 36. The portions 35 and 36 are arranged with the convex sides tangent at a plane normal to the long axis of the ring assembly which passes centrally through the ring 33. Portions 37 and 38 of ring 34 are similarly arranged. If desired, one or a plurality of ports such as port 39 may be provided to afford access of lubricants, cooling agents, or the like through the seal.

The arrangement of Figure 6 is particularly well suited for sealing two liquids against admixture along the shaft or for sealing between a vacuum and a liquid.

It has been stated above that sealing rings of the present invention may be made of natural or synthetic rubber, for example, rubber of about 50–60 Shore. Actually the principal property sought is that of elasticity. With elasticity the profiling here disclosed affords its principal advantages. Naturally in the case of a vibrating shaft the hysteresis of the elastic material must be kept at a small value. Due to the shape of the rings described in connection with Figures 2, 5 and 6, substantial spring action from the resilient material is attained.

Another advantage of the construction here disclosed is that the use of follower elements such as 24 is not structurally necessary and the shaft housing may be provided with a cavity 40 such as is shown in Figure 5 and that cavity itself can be dimensioned so that the installation of the ring therein brings about the desired axial compression.

It will be observed that the common feature of all of the various forms of sealing rings which have been described is the excess of area of the convex surface of the outer portion of the ring over the convex surface of the inner portion thereof. Another common feature is that the outer portion of the ring is of greater axial length than the inner portion. Still another common feature is that the thickness of the outer portion is greater than that of the inner portion. These features, coupled with the resiliency of the material, insure that the ring will not turn with the shaft but will be held in fixed position by the housing. All of the foregoing may be otherwise expressed by stating that while the inner and outer component portions of the sealing rings are symmetrical in an axial sense they are asymmetrical in a radial sense.

Due to the very narrow ridges which actually effect the seal, it is apparent that the frictional drag imposed on the shaft is very small.

While the invention has been described with reference to several embodiments thereof, it is to be understood that the description is for exemplary purposes to instruct those skilled in the art in the manner in which the advantages of this invention may be achieved.

What is claimed is:

1. A sealing ring for a shaft that projects from, and is free to rotate in, a housing, the cross section of one wall of the ring comprising integrally connected inner and outer resilient crescent-shaped portions, the outer portion being adapted to contact the housing, the inner portion being adapted to contact the shaft, the crescent-shaped portions having convex surfaces which face each other in symmetrically overlapping relation, the concave surface of each portion having a radius of curvature greater than the radius of curvature of the convex surface thereof as drawn from spaced centers lying in a plane passing through the center of said ring normal to the axis thereof, the axial length, area, and thickness of the outer portion exceeding that of the inner portion.

2. A sealing ring as defined by claim 1 with said portions having a radial aperture therethrough extending from the concave surface of the inner portion to the concave surface of the outer portion.

3. A sealing member comprising a plurality of rings as defined by claim 1, said rings being axially contiguous at one end of their adjacent outer portions.

References Cited in the file of this patent

UNITED STATES PATENTS

| Number | Name | Date |
| --- | --- | --- |
| 511,734 | Hoffstadt | Dec. 26, 1893 |
| 1,867,891 | Reynolds | July 19, 1932 |
| 1,931,733 | Leibing | Oct. 24, 1933 |
| 2,079,949 | Novati | May 11, 1937 |
| 2,165,052 | Hering | July 4, 1939 |
| 2,356,947 | Pranger | Aug. 29, 1944 |
| 2,547,185 | Von Bolhar | Apr. 3, 1951 |